US 8,000,962 B2

(12) United States Patent
Doyle et al.

(10) Patent No.: US 8,000,962 B2
(45) Date of Patent: Aug. 16, 2011

(54) METHOD AND SYSTEM FOR USING INPUT SIGNAL QUALITY IN SPEECH RECOGNITION

(75) Inventors: John Doyle, Glasgow (GB); John Brian Pickering, Winchester (GB)

(73) Assignee: Nuance Communications, Inc., Burlington, MA (US)

( * ) Notice: Subject to any disclaimer, the term of this patent is extended or adjusted under 35 U.S.C. 154(b) by 414 days.

(21) Appl. No.: 11/419,330

(22) Filed: May 19, 2006

(65) Prior Publication Data
US 2006/0265223 A1    Nov. 23, 2006

(30) Foreign Application Priority Data

May 21, 2005   (GB) ................................. 0510451.8

(51) Int. Cl.
*G10L 15/00*   (2006.01)
(52) U.S. Cl. ........................................ 704/240
(58) Field of Classification Search .................. 704/240, 704/231
See application file for complete search history.

(56) References Cited

U.S. PATENT DOCUMENTS

| 6,138,094 A | 10/2000 | Miet et al. |
| 6,151,575 A | 11/2000 | Newman et al. |
| 7,228,275 B1 * | 6/2007 | Endo et al. ............... 704/235 |
| 7,742,914 B2 * | 6/2010 | Kosek et al. ............... 704/205 |
| 2002/0019734 A1 | 2/2002 | Bartosik |
| 2002/0095295 A1 * | 7/2002 | Cohen et al. ............... 704/275 |
| 2003/0004712 A1 * | 1/2003 | Erell ............... 704/225 |
| 2003/0033152 A1 * | 2/2003 | Cameron ............... 704/275 |
| 2004/0162722 A1 | 8/2004 | Rex et al. |
| 2005/0080627 A1 * | 4/2005 | Hennebert et al. ............ 704/270 |
| 2005/0171775 A1 * | 8/2005 | Doyle ............... 704/250 |
| 2006/0074651 A1 * | 4/2006 | Arun ............... 704/233 |
| 2006/0178882 A1 * | 8/2006 | Braho et al. ............... 704/240 |
| 2006/0205449 A1 * | 9/2006 | Hillyard ............... 455/575.2 |
| 2006/0210096 A1 * | 9/2006 | Stokes et al. ............... 381/107 |
| 2009/0198493 A1 * | 8/2009 | Hakkani-Tur et al. ........ 704/235 |

FOREIGN PATENT DOCUMENTS

| EP | 0 154 020 | 3/1988 |
| JP | 54091006 A2 | 7/1979 |
| JP | 2001075595 A2 | 3/2001 |

* cited by examiner

*Primary Examiner* — Jakieda Jackson
(74) *Attorney, Agent, or Firm* — Wolf, Greenfield & Sacks, P.C.

(57) ABSTRACT

A method and system for using input signal quality in an automatic speech recognition system. The method includes measuring the quality of an input signal into a speech recognition system and varying a rejection threshold of the speech recognition system at runtime in dependence on the measurement of the input signal quality. If the measurement of the input signal quality is low, the rejection threshold is reduced and, if the measurement of the input signal quality is high, the rejection threshold is increased. The measurement of the input signal quality may be based on one or more of the measurements of signal-to-noise ratio, loudness, including clipping, and speech signal duration.

23 Claims, 9 Drawing Sheets

METHOD AND SYSTEM FOR USING INPUT SIGNAL QUALITY IN SPEECH RECOGNITION

CROSS-REFERENCE TO RELATED APPLICATIONS

This application claims the benefit under 35 U.S.C. §119 of the filing date of United Kingdom Patent Application No. 0510451.8 filed May 21, 2005.

FIELD OF THE INVENTION

This invention relates to the field of automatic speech recognition (ASR) and, in particular, it relates to improving speech recognition by using input signal quality.

Currently, automatic speech recognition (ASR), especially in impoverished environments such as telephony, pre-processes the incoming acoustic signal in an attempt to remove spurious noise and to improve the signal quality. The final result from the recognition engine is a machine-readable text string. The machine-readable text string is used in applications which process the information and provide appropriate services or output.

The result from the recognition engine is typically a text representation of what is assumed to have been said, along with a confidence score, which indicates how close the match is deemed to be. Typically, the confidence score is effectively the only metric usable by an application using the ASR output. A high score is assumed to be correct, and a low score is assumed to be incorrect. Recognition engines often have a rejection threshold based on the confidence score. The rejection threshold is the confidence score below which the ASR will flag the result as incorrect. A problem is that the ASR cannot make this judgment from a user's perspective.

Figure 1:
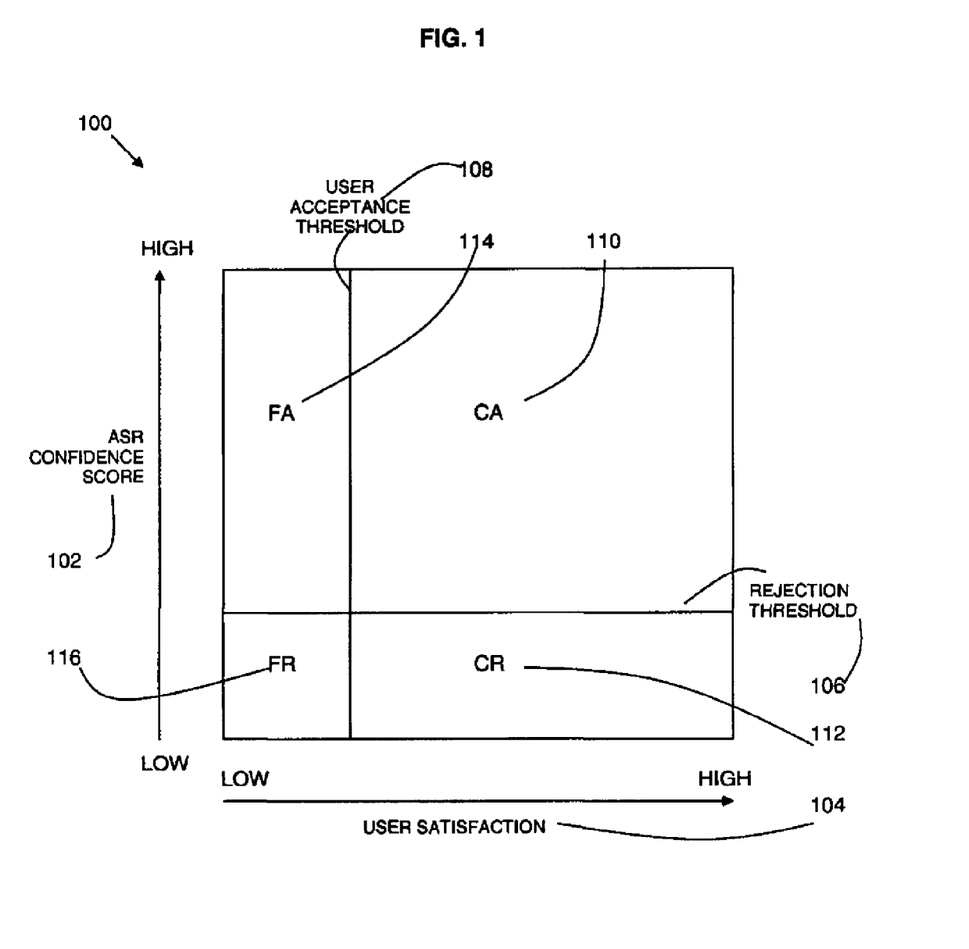
FIG. 1 is a graph showing ASR confidence scores against user satisfaction.

FIG. 1 shows how confidence scores from a recognition engine and user perception relate. FIG. 1 is a graph 100 showing confidence scores 102 against a measure of user satisfaction 104. The confidence scores 102 increasing from low to high are shown on the vertical axis of the graph 100 and the user satisfaction 104 is shown from low to high on the horizontal axis. A rejection threshold 106 and a user acceptance threshold 108 are set.

In simple terms, if the user's input leads to the correct response (i.e., the text equivalent of what they said) and the result is associated with a high confidence score, then the result is likely to be accepted by the recognition engine and correctly so (CA=correct accept 110). Conversely, if the result is wrong, and the confidence score is low, it is correctly rejected by the recognition engine (CR=correct reject 112). In both of these cases, the user is satisfied. However, if the result is actually wrong (i.e., the text is not what the user said) and yet leads to a high confidence score, then the recognition engine will falsely accept it (FA=false accept 114). Conversely, if the result is correct but associated with a low confidence score, the recognition engine incorrectly rejects it (FR=false reject 116). In both cases—FA 114 and FR 116— an application using the ASR output cannot know that the result is a false accept or false reject without explicit prompting, and the user is likely to be frustrated by the perceived performance of the system.

In practical terms, this situation arises through poor understanding of why ASR technologies return incorrect results. The main reasons may include:
 (a) signal quality;
 (b) out of grammar/vocabulary—that is a word or words not represented in the ASR grammar;
 (c) spoke too soon—that is, for non barge-in enabled applications, where part of the input is lost because the user speaks over the pacing tone;
 (d) spoke way too soon—as (c), but now input is complete before the pacing tone ends (and sometimes even starts);
 (e) user population—accent (and, in some cases, dialect) differences.

These conditions may be signaled directly back to the user (for example, with a message "Sorry, I think you may have spoken too soon. Please wait for the tone . . . "). Alternatively, the number of recognition retries is counted, that is the number of times a user must repeat the same input. If a preset threshold of the number of retries is exceeded, such as three attempts in all, then the application may adopt different strategies such as transferring the caller to an agent, offering touchtone input instead of speech, and so forth. This is referred to as dynamic problem determination as it is carried out during the application itself.

Based on commonly encountered hit rate issues with implementations of ASR for speech-enabled services, and the fact that there is little an application developer can do in real terms to recover or prompt users appropriately in many circumstances, an improvement to ASR systems is needed. The addition and retention of a metric of raw signal quality for improving an ASR system is proposed.

SUMMARY OF THE INVENTION

One aspect of the present invention is a system that uses measures of raw signal quality. With the system, a final recognition result can be returned to an application with additional information, thus aiding the appropriate interpretation of the confidence score as well as recognition engine performance. Thus, user satisfaction increases since the application can now better process recognition results and avoid providing inappropriate instruction ("Please speak louder", "Please speak more clearly" . . . etc) which may not resolve any particular recognition problem and thereby confuse the user.

For problem determination and recovery in known systems, there is no indication of how good or otherwise the original signal might have been.

Input signal quality information could be used implicitly by the recognition engine itself dynamically to reduce or raise acceptance thresholds during search. Input signal information could also, or alternatively, be used explicitly as an additional flag back to the application for confirmation or recovery purposes. In this way, the user can be better guided should a problem occur, which in turn will increase perceived recognition engine performance.

The raw signal quality metric of the system can be based on one or more of the following measurements:
 (1) SNR (signal-to-noise ratio);
 (2) mean loudness; and
 (3) speech signal duration.

In many cases, the result from a recognition engine would benefit by the inclusion of the raw signal quality metric proposed. This would lead to increased user satisfaction through more appropriate application coding.

According to a first aspect of the present invention there is provided a method for using input signal quality in an automatic speech recognition system, comprising: measuring the quality of an input signal into a speech recognition system; varying a rejection threshold of the speech recognition system at runtime in dependence on the measurement of the input signal quality.

If the measurement of the input signal quality is low, the rejection threshold can be reduced and, if the measurement of the input signal quality is high, the rejection threshold can be increased.

In one embodiment, the rejection threshold can be set in an underlying multivariate Gaussian distribution within an acoustic model of the speech recognition system. Reducing the rejection threshold increases the skirts of the underlying multivariate Gaussian distribution and increasing the recognition threshold reduces the skirts of the underlying multivariate Gaussian distribution.

In an alternative embodiment, the rejection threshold can be a configurable rejection threshold of a pattern matcher based on a confidence value of the output of the speech recognition system.

The step of measuring the quality of an input signal may measure one or more of the following: the signal-to-noise ratio of the input signal; the loudness of the input signal; and a speech signal duration. It can also determine if the input signal is clipped. The speech signal duration of the input signal may be compared to the duration of a signal for a text-to-speech converted word.

The method can provide an input signal quality score for each time-slice. The input signal quality score can be based on a combination of loudness and signal-to-noise ratio. A time-slice with a clipped signal can be indicated as unreliable. The input signal quality scores for time-slices over a speech signal can be summed and a confidence score for the output of a speech recognition system can be normalized by the input signal quality score for the speech signal.

According to a second aspect of the present invention, there is provided a system for using input signal quality in a speech recognition system, the system comprising: a measure of quality of an input signal into a speech recognition system; and a pattern matcher with a rejection threshold variable at runtime of the speech recognition system in dependence on the measurement of input signal quality.

In one embodiment, the pattern matcher can include an acoustic model and the rejection threshold can be set in the underlying multivariate Gaussian distribution within the acoustic model. In an alternative embodiment, the rejection threshold may be a configurable rejection threshold of the pattern matcher based on a confidence value of the output of the speech recognition system.

According to a third aspect of the present invention, there is provided a computer program product stored on a computer readable storage medium for using input signal quality in an automatic speech recognition system, comprising computer readable program code means for performing the following steps: measuring the quality of an input signal into a speech recognition system; and varying a rejection threshold of the speech recognition system at runtime in dependence on the measurement of the input signal quality.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENTS

Automatic speech recognition systems can be thought of as processing the speech signal via three steps:
(i) acoustic pre-processing;
(ii) statistically-based pattern matching; and
(iii) linguistic decoding.

Figure 2:
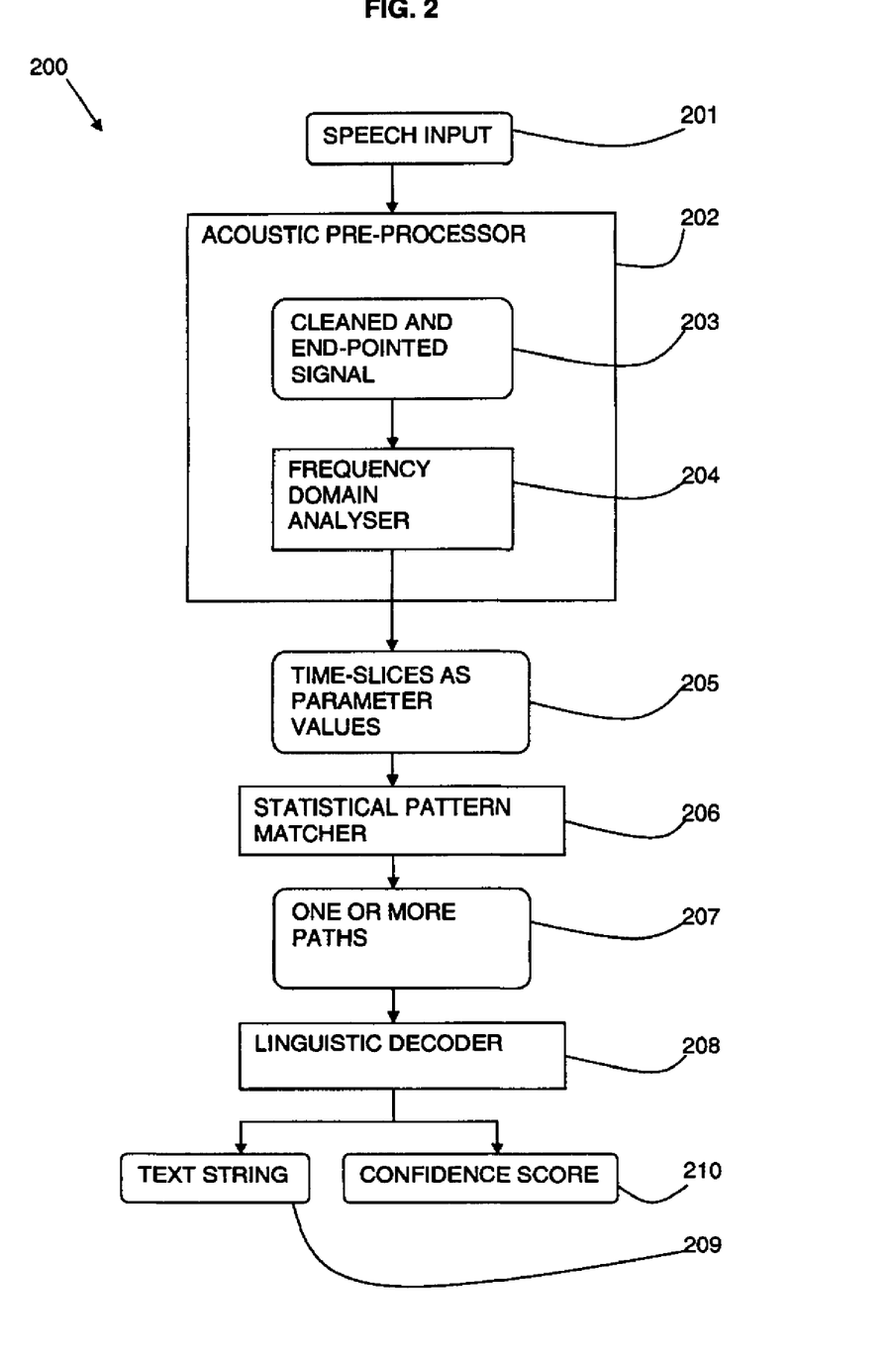
FIG. 2 is a schematic diagram of the processing steps of an ASR system as known in the prior art.

Referring to FIG. 2, a process flow 200 through an ASR system is shown with data forms shown in curved boxes and system processes shown in rectangular boxes.

A speech input 201 in the form of a time-varying continuous acoustic signal can be passed to an acoustic pre-processor 202. Via configuration parameter settings (for threshold levels and so forth) as well as dynamic modeling, the acoustic pre-processor 202 can do the following:
(a) Marks the beginning and end of speech within the signal. This is often termed "end pointing" and is done by looking for overall energy levels above a specific threshold so that the recognition engine will concentrate on useful information only (the speech content, ignoring onset and offset silence);
(b) Attempts to remove transient noise(s) from the signal such as clicks and extraneous transmission channel effects;
(c) Attempts to remove paralinguistic events (such as mumbles—though this may be done later in the processing);
(d) Attempts to remove long-term noise effects, such as background 'hum', by modeling the characteristics of perceived signal distortion.

The output is an end-pointed signal 203, cleaned of extraneous interference. This can then be analyzed in the frequency domain 204—via windowing, Fast Fourier Transform (FFT), and then spectral estimation—to represent a current time slice as a finite set of parameters 205 for subsequent processing. These parameters may be further normalized (quantized), for instance, to reduce variability in level.

Some ASR systems during this stage implement additional processing steps, such as pre-emphasis separately or as part of quantization. In general terms, and especially for poorer quality signals, pre-emphasis is well motivated, though not for speech which is already loud.

The set of frequency-domain parameters 205 are logically then passed to the statistically-based pattern matcher 206. In practice, parameter sets per time slice are passed on to ensure quasi real time processing, and that a result is available as soon as speech ends.

The pattern matcher 206 typically uses an acoustic model, which for HMM (hidden Markov Model) type recognition includes Gaussian distributions around states and transitions between states. The states represent idealized N-dimensional profiles where N reflects the number of acoustic parameters extracted from the incoming signal. In simple terms, the states identify typical variations for a given population and a given sound or section of sound (i.e., the onset, steady-state, and offset). By contrast, the transitions represent, again probabilistically, the likelihood that the current state could have been reached from the previous state or states. Transitions between "sounds" mimic the phonotactics (the possible co-locations and sequences) of the language and, because the transitions are possible back to the same state, durational differences are effectively normalized and ignored.

The essence of the pattern matcher 206 is to interpret the input signal in terms of what known sounds within the acoustic model best match that signal. This will involve at least one path through the model. Any given path would be associated with a cumulative probability as the matching progresses. In practice, usually multiple paths are traversed during pattern matching. The output from this stage is one or more paths 207 through the model with its associated probability.

The path/paths 207 from the pattern matcher 206 is/are now presented to a linguistic decoder 208. Most current telephony recognition engines are grammar-based. A grammar contains all possible words and/or phrases which the recognition engine will accept.

For example, if a grammar is defined as:
<color>=red OR yellow OR pink OR green
then only these four colors are expected as input. Any other color (blue, grey etc.) cannot be recognized.

Similarly, if a grammar is defined as:
<service>=(I'd like (to check)) (my) (account) balance (please).
where the rounded brackets specify optional items, then it could handle:
"I'd like to check my balance"
"I'd like my account balance, please"
"My account balance", etc.

With the sequence of sounds (the path(s) 207) returned by the pattern matcher 206, the linguistic decoder 208 now attempts to match to the closest possible result based on the possibilities defined in the grammar. This is not usually a simple process of sound-to-letter conversion, but can often include "fuzzy" or optional matches to increase the likelihood of a valid result being returned.

If a match is found, then the associated text string 209 is returned as the recognition result to the application along with the associated confidence score 210. The confidence score 210 may either be the raw pattern-matcher score, or derived from it on the basis of how straight-forward the decoder's task was in retrieving a valid response from the grammar based on the path(s) delivered.

The aspects of the proposed method and system use raw signal quality to aid an application using the ASR output in making judgments about the recognition result—"explicit modeling"—as well as allowing the pattern-matcher itself to process the incoming signal—"implicit modeling".

Figure 3:
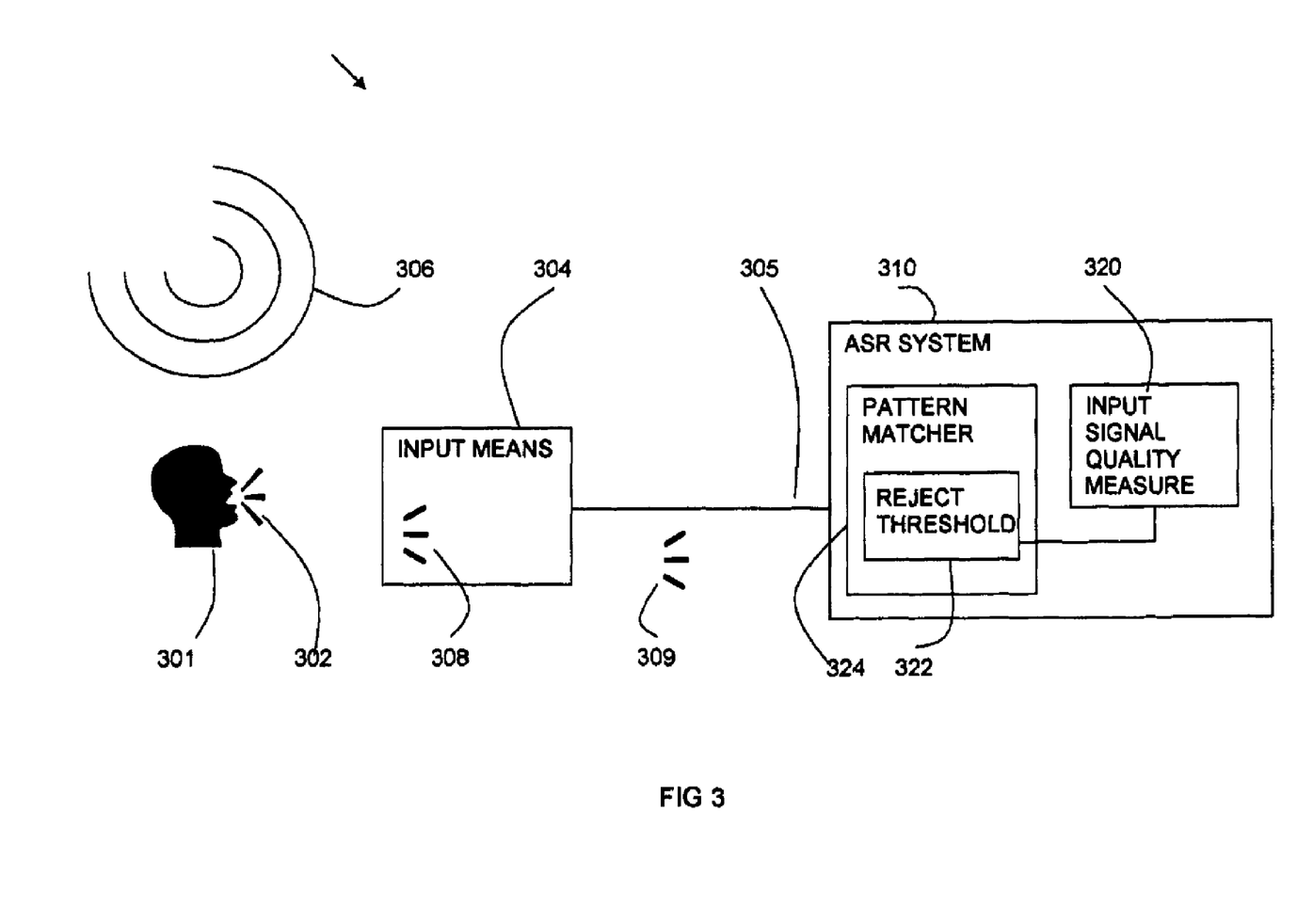
FIG. 3 is a block diagram of a system in accordance with the present invention.

Referring to FIG. 3, a block diagram of a system 300 in accordance with the present invention is shown. A speech input 302 from a person 301 is received by a speech input means 304. The speech input means 304 transmits an acoustic signal representing the speech input 302 to an ASR system 310 via a transmission means 305.

In addition to the speech input 302, there may also be background audio noise 306 at the location of the person 301 making the speech input 302. Signal noise 308 may also be generated by the input means itself 304 or signal noise 309 may be generated by the transmission means 305 during transmission to the ASR system 310. In any event, the resulting input acoustic signal received at the ASR system 310 may be of varying quality.

The ASR system 310 includes an input signal quality measuring means 320 which quantifies the quality of the input signal. A rejection threshold adjustment means 322 is provided in a statistical pattern matcher 324 of the ASR system 310.

An input signal quality measure can be analyzed as follows.

(1) SNR (signal-to-noise) measure: A signal-to-noise estimate is the ratio between good candidate signal (speech) to background noise. A high value suggests that the signal is well differentiated from the noise; a low value, that signal and noise are less distinguishable. The SNR affects later processing. The SNR can be estimated by standard signal processing techniques which usually involve frequency as well as time domain analyzes.

(2) Loudness: The maximum excursion of the signal from a baseline gives an estimate of loudness. The overall possible loudness of the transmission channel, e.g., a telephone connection, is separately defined and controlled by the PTT administration in a country. Loudness can be flagged as one of the following:

(a) clipped: Clipping is when the sound exceeds a certain maximum level such that the tops of the sound waves are cut off leaving square tops. This gives a muffled sound. The PTT specifies a maximum signal level for transmission and a clipped sound is therefore defined when the maximum excursion is within 5% of the PTT specified maximum;

(b) loud: the maximum excursion is between 50% and 95% of the PTT specified maximum;

(c) quiet: the maximum fails to reach or exceed 50%.

These give five measures:
(i) High SNR;
(ii) Low SNR;
(iii) Clipped;
(iv) Loud; and
(v) Quiet with (i) and (ii) marking how well a valid signal can be distinguished from background/channel noise; and (iii)-(v) giving an estimate of loudness. The SNR measures and loudness measures are used in combination to provide a measure of raw signal quality.

(3) Speech signal duration. Considering one possibility for temporal modeling, the implementation would involve comparing an overall duration of a valid speech within an incoming signal to some pre-stored value or expectation.

Figure 4A:
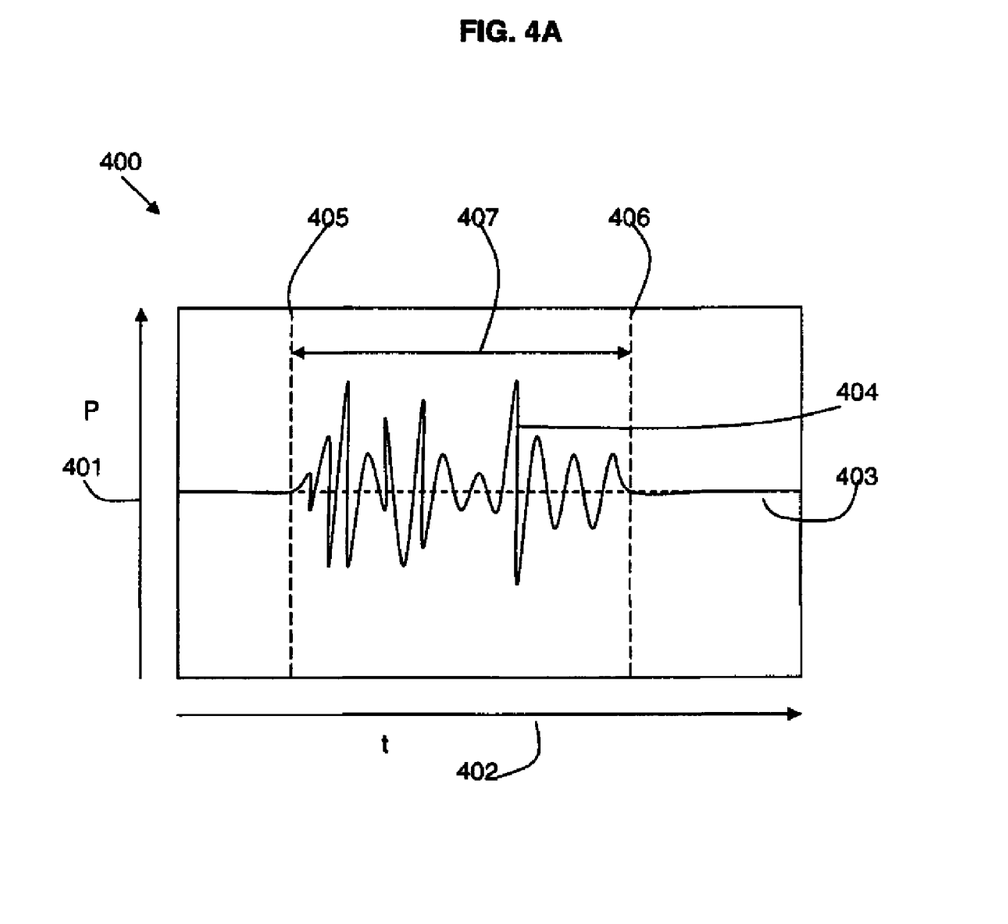
FIGS. 4A and 4B show the duration of a speech section of a signal and a method of duration estimation of a word in accordance with an aspect of the present invention.

FIG. 4A shows an acoustic input signal 400. The vertical axis 401 represents the power of the signal in the form of excursion from a baseline 403 in a positive or negative direction. The horizontal axis 402 represents time. The schematic waveform 404 shown might represent a short word such as "hour". At time 405, the waveform 404 begins to depart from the baseline 403 and this is taken as the beginning of valid speech. The signal before can be assumed to be silence. At time 406, the speech is dying away; after this point, the signal returns to silence. (In practice, of course, a waveform is rarely this clean.) The time between these two points (406-405) represents the duration of the word.

Duration is known to vary with a number of factors, including speaking rate, emphasis and individual content (certain sounds are intrinsically longer than others). However, gross and large differences in duration can indicate that two sections of speech do not contain the same sounds. In other words, duration can provide an additional indicator of the appropriateness of the incoming signal to the recognition result.

Figure 4B:
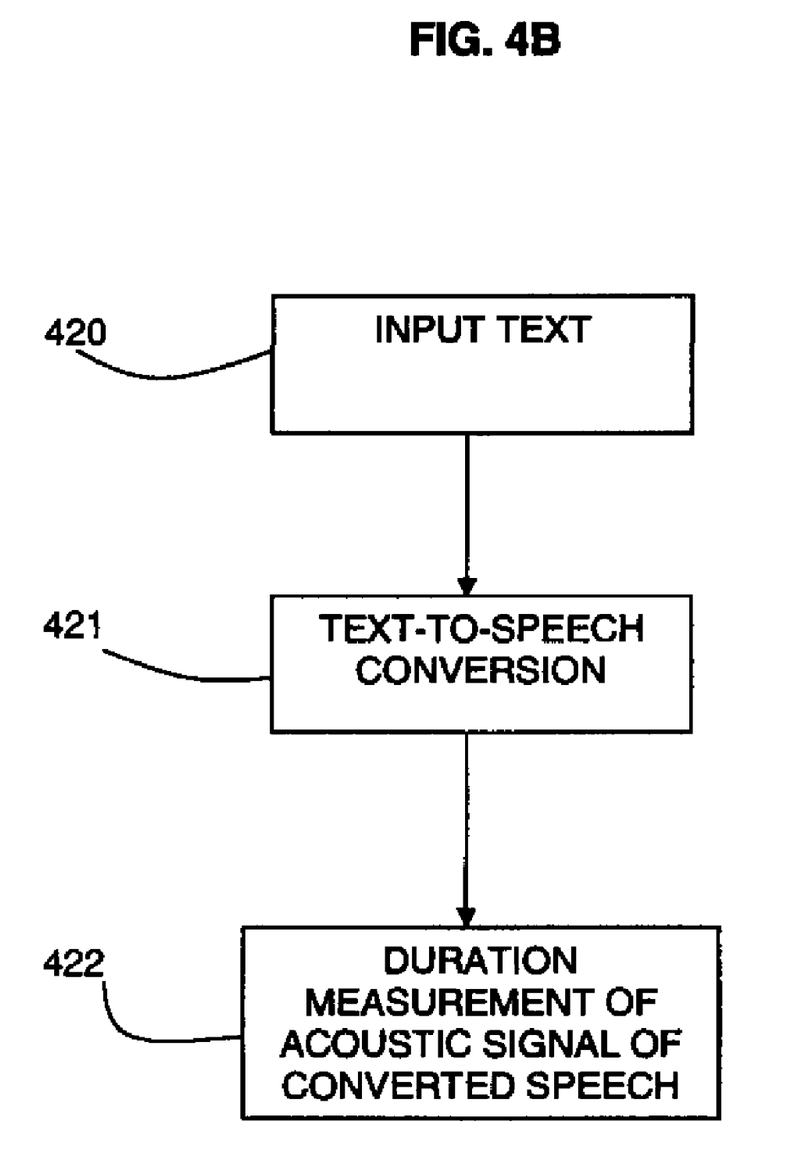

Referring to FIG. 4B, a word in text form 420 is input into a text-to-speech synthesizer to convert 421 it to an audio signal. This process varies according to different types of synthesis technologies, but the basic principles remain the same and are well understood by those practiced in the art. If the duration of the output is considered 422, an assumed duration for one version of this word is obtained.

If user input to a recognition engine is to be matched against a list of words (a "grammar"), then if the TTS (text-to-speech) output for these words is examined, target durations for each word can be calculated. When the input is passed to the acoustic front-end, as part of end-pointing, the duration of the valid speech can be calculated and then compared to the target duration of the TTS output.

Any gross variation can add to the overall signal quality measure since durational differences may reflect, for instance, the presence of background noise during the actual pronunciation of the target word or words.

Figure 5A:
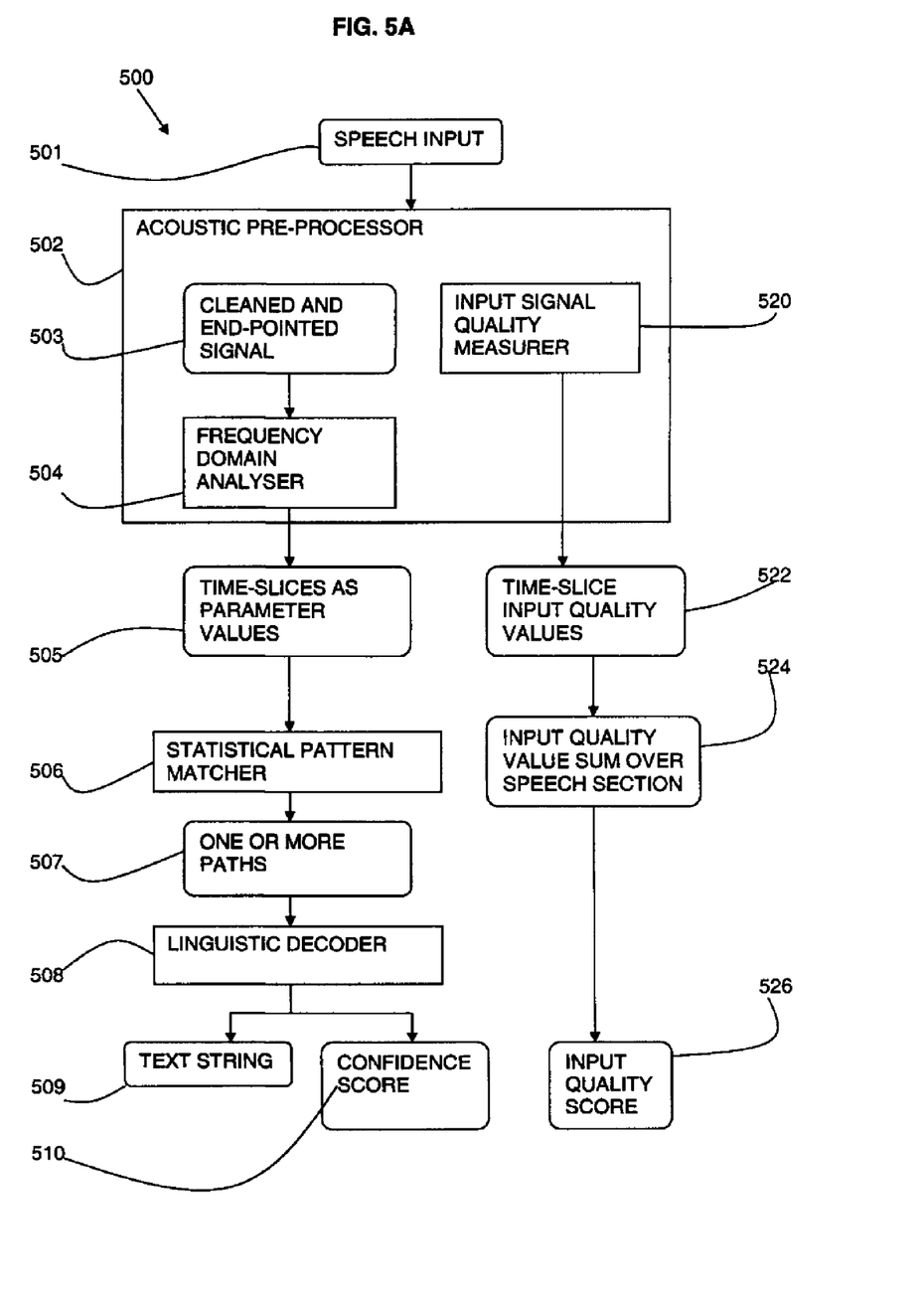
FIGS. 5A to 5C are schematic diagrams of the processing steps of an ASR system in accordance with different aspects of the present invention.
Figure 5B:
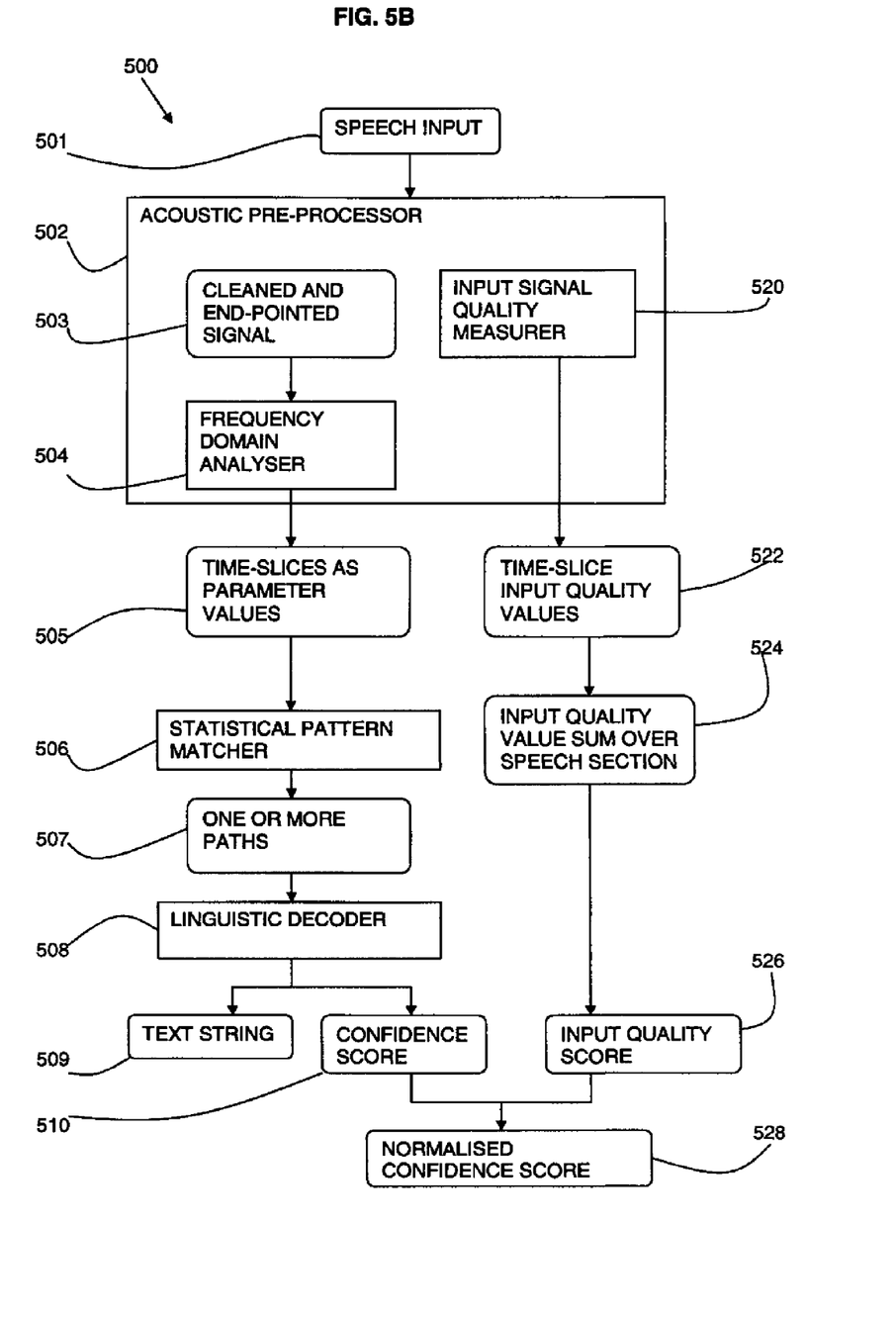
Figure 5C:
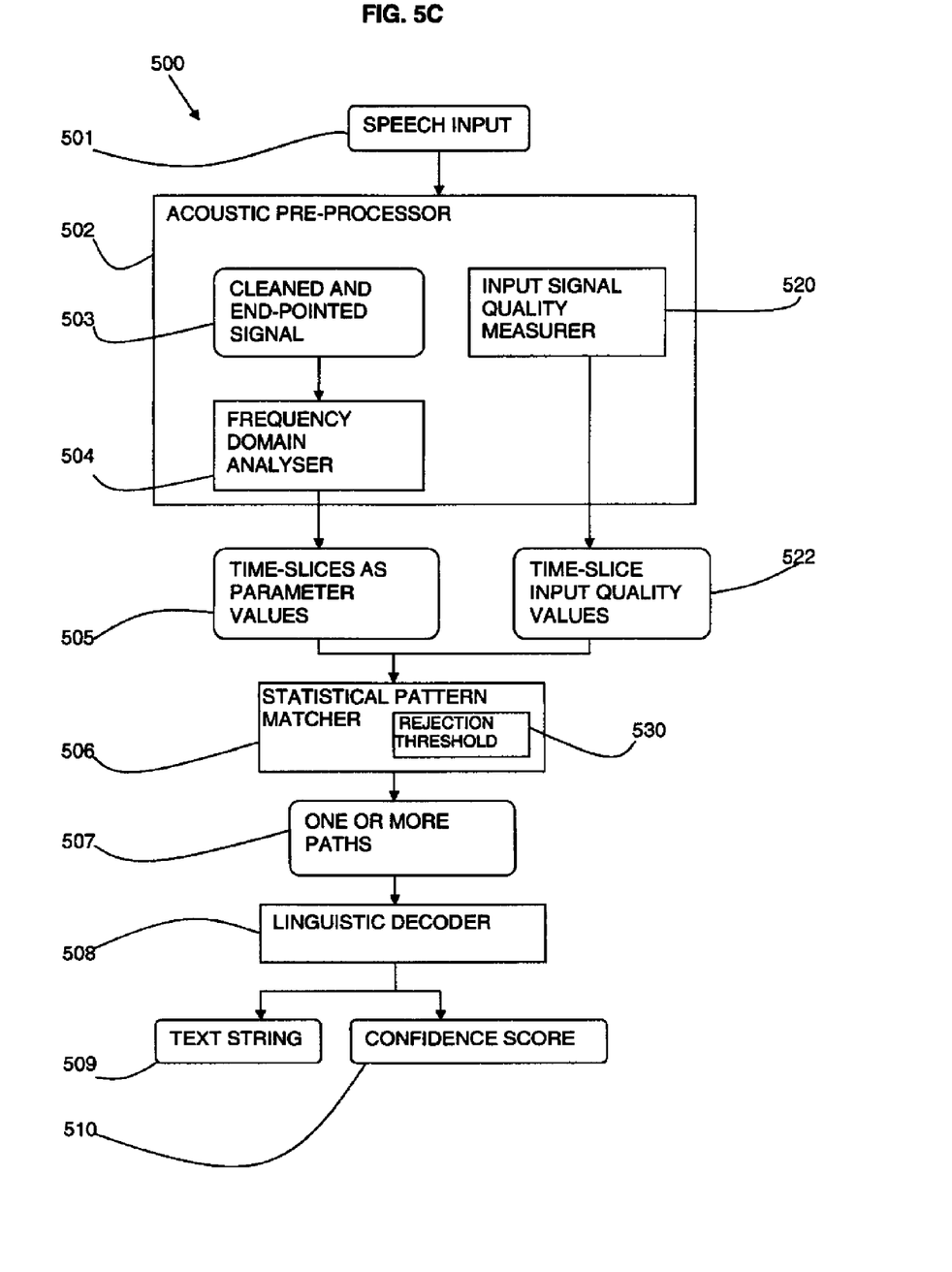

Referring to FIGS. 5A to 5C, the process flow 500 through an ASR system in accordance with aspects of the present invention is shown. The features described in relation to FIG. 2 are provided (with the same reference numbers as in FIG. 2 with the prefix 5 in place of 2). In addition, the process flow 500 includes input signal quality measurement and processing.

Input speech is analyzed in time-slices by the acoustic pre-processor 502. Time-slices can be from approximately 10 to 50 msecs depending on the recognition engine. In the pre-processor 502, signal quality measurement is determined 520.

In one embodiment, SNR and loudness can each be flagged with one of the possible terms (High, Low, and Clipped, Loud, Quiet) for each time-slice 522. In conjunction with standard recognition engine configuration parameters—such as 'triggerlevel' used to define when potential speech has begun—they will be ignored if the time-slice is deemed to be non-speech.

A High SNR on its own would seem to be optimal, and should therefore boost confidence. However, in the case of a High SNR in association with Clipped, this is not the case. In the case of a High SNR in association with Loud or Quiet, however, then it remains a good indicator that the signal is of sufficient quality, although obviously "Loud" is better than "Quiet".

In consequence, and to make explanation simpler, the following scores are allocated:
(i) in association with (iv) is given a score of 4;
(i) in association with (v) is given a score of 3;
(i) in association with (iii) is given a score of 0.

A Low SNR could indicate a noisy environment, especially in association with Loud. The following scores are allocated for Low SNR:
(ii) in association with (iv) is given a score of 1;
(ii) in association with (v) is given a score of 2, because this may just mean that the speaker does not have a loud voice;
(ii) in association with (iii) is again given a score of 0.

In addition, the comparison of the duration of a word signal to a sample duration for a target word may also be used to give a measure of input signal quality.

The input signal scores can be used in a number of different ways as shown in FIGS. 5A to 5C.

In a first embodiment shown in FIG. 5A, the input signal values for time-slices are summed 524 over the length of that part of the speech signal containing valid speech. Thus a single quality estimate is provided across the whole, valid speech signal. This should be normalized to an average length of signal to avoid potential ambiguities based on signal duration.

For explicit modeling, this figure can be provided as an output 526 addition to the confidence score.

In a second embodiment shown in FIG. 5B, this figure can also be used to normalize 528 the confidence score 510 itself. In this case, the confidence score 510 is normalized by a factor derived by comparing the maximum and minimum possible scores. For instance, if there are 100 time-slices of valid speech in the signal, the maximum score would be 500, and the minimum 0. A score of 500 lies at 0.75. This is then applied to the confidence value. Where clipping occurs in any time-slice, this should be signaled separately to the application.

In a third embodiment shown in FIG. 5C, implicit modeling is based on the raw signal quality. Individual scores for each time-slice 522 are sent to the pattern matcher 506 along with the parameterized values 505 used for matching.

A clipped signal (score: 0) should be treated with caution by the pattern matcher 506, and a dummy label—like a wildcard—assumed for that time-slice.

By way of example, an application may ask a user to input a location. The user says "Staines" for instance, but the signal quality may be poor owing to transient noise on the line. This may lead to the "t" and the final "s" sound being less distinct. Marking the recognition result prior to decoding as "s*ain*" would allow for potential matches to both Staines and Spain. The advantage being that providing both as candidate results would allow the application to make a choice. This may be done for instance, asking the user to specify whether indeed they said Staines or Spain rather than simply having to re-request the location.

Any value other than a score of 0, affects the tolerance allowed in the matching. A low score would increase the tolerance for one or more parameters. A high score would decrease the tolerance.

A stricter threshold is therefore applied in the pattern matching for any given state if the signal quality is assumed good. Although this may seem perverse, since it will effectively reduce the likelihood of a correct match, this is based on the assumption that a high quality signal, if it does indeed match a particular state, should fall centrally within the distribution. Conversely, if it is of high quality, but is not appropriate to match to a particular state (i.e., it is part of a different sound altogether), it should have less chance of leading to an erroneous match.

The pattern matcher 506 can dynamically shift matching thresholds 530 on the basis of feedback about the assumed quality of the signal itself.

There are two described embodiments of using the signal quality measure to alter the threshold.
1. To allow the underlying normal distributions within the acoustic model to be modified in accordance with the calculated signal quality measure; or
2. To shift the configurable rejection threshold in accordance with the calculated signal quality measure.

In the first embodiment of threshold adjustment, the underlying normal distributions within the acoustic model of the pattern matcher can be modified in accordance with the calculated signal quality measure.

A normal or Gaussian distribution is represented by a typical bell curve. The "skirts" of the bell extend around the mean (the highest point of the bell), and represent increasing unlikeliness that a value can be said to match the mean. In other words, the skirts represent decreasingly likely values above and below the mean. It is common to use + or −1.96 standard deviations as the area of the distribution representing some 95% of the sample or population. Extending the skirts of the distribution therefore means that the tolerance increases: values further from the mean will be regarded as possible matches to the mean. Reducing or narrowing the skirts conversely reduces the tolerance: values must be closer to the mean to be regarded as possible matches.

Figure 6:
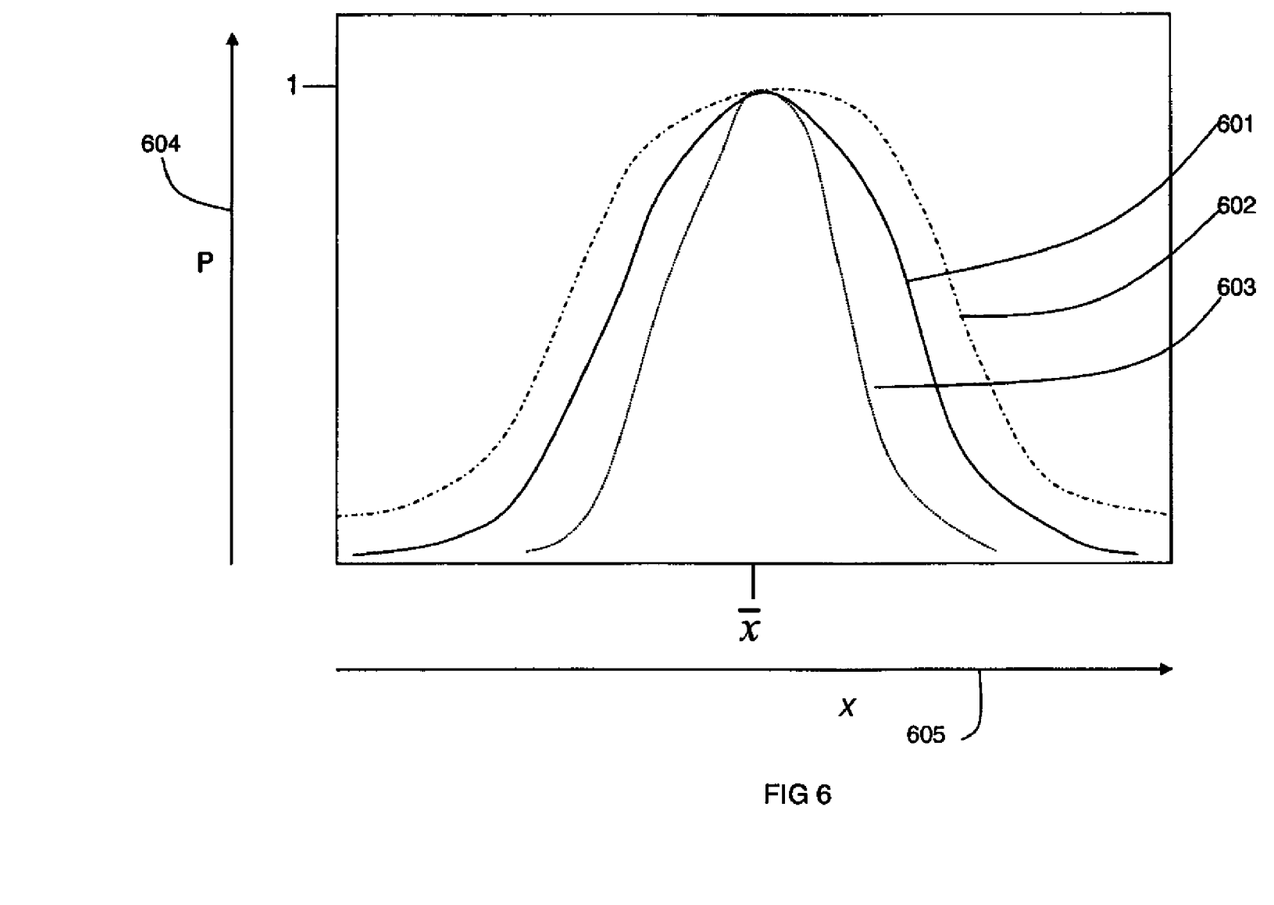
FIG. 6 is a diagram showing changing acceptance threshold for one-dimension in accordance with an aspect of the present invention.

Referring to FIG. 6, a typical normal or Gaussian distribution 601 is shown. The probability of x is shown along the vertical axis 604 from 0 to 1. The value of x is shown along the horizontal axis 605. The mean value is shown by $\bar{x}$ and the "skirts" of the distribution are shown as the unbroken curve above and below the mean. It should be noted that this shows a possible distribution for a single variable. For the (quantized) parameter vectors in recognition, there are multiple variables assumed to correlate for each state in the acoustic model.

If the signal quality measure indicates that the incoming audio is generally "poor", the distributions in the model may be dynamically increased. This is shown as the broken line 602. Values may therefore fall further from the mean and still be regarded as a candidate match.

Conversely, if the signal quality is generally "good", the distribution may be dynamically reduced. This is shown as the dotted line 603.

In practical terms, this would mean that with a poorer signal, the acoustic model would be skewed to be more tolerant. A better result is therefore more likely. This may not be the correct result, but at least the application can use what was returned to direct the user as to what to say for confirmation. (For example, with a prompt "I think you may have said X . . . Is that right or should I try again?")

However, if the signal quality is assumed to be very good, spurious matching needs to be avoided and so by reducing the skirts of the distribution, a stricter match is imposed before a result is returned. Although this may result in more results flagged as "rejected" by the recognizing engine, it also means that when the user has articulated clearly, the user is not confused by being asked to confirm a result which the user perceives as very different to the input.

Explicitly changing the probability distribution characteristics in this way affects the underlying acoustic model and is analogous to adaptive methods that take into account speaker demographics (population age, accent, dialect etc.). In this embodiment, the acoustic model is dynamically and automatically modified in accordance with a measure of the quality of the incoming acoustic signal. In other words, the threshold is adapting to the carrier signal and not to the contents of that signal.

In the second embodiment of threshold adjustment, the configurable rejection threshold in the pattern matcher is adjusted in accordance with the calculated signal quality measure. This embodiment does not involve changes to the acoustic model. In most currently available recognition implementations, the system administrator or application programmer may set a rejection threshold. This value is used by the decoder to identify back to the calling application that although a match has been made, the confidence value (a derivative of the cumulative probability score from the acoustic model) has fallen below an expected threshold. Referring now to FIG. 1 and the horizontal line labeled "Rejection Threshold" (106), as the rejection threshold moves up or down the chart, the results correctly identified as wrong (CR) and correctly identified as correct (CA) also change. Dynamically shifting the configured rejection threshold is done in tandem with the raw signal quality measure.

Using the signal quality measure to raise the threshold is equivalent to reducing the spread of the skirts of the Gaussian distributions. Similarly, lowering the threshold is equivalent to increasing the spread of the skirts. These equivalents are similar in effect, and result in changes to user satisfaction as well as an increase in the potential ways an application can interact with the user more effectively.

They differ, however, in ease of implementation as well as practical utility. The method of the second embodiment of raising or lowering the threshold is easier to implement because it does involve changes to the underlying acoustic model at runtime. In addition, it can make use of the raw signal quality measure for the whole period of valid speech. With the method of the first embodiment, the signal quality measure would have to be estimated synchronously with time-slice extraction to be most effective.

In conclusion, estimating raw signal quality on input may be used to aid the application developer as well as altering matching thresholds in the ASR system itself. The application developer may explicitly receive this measure, preferably in addition to the confidence value, since this will allow potentially more appropriate feedback to the caller. For example, where clipping has occurred, there is no point in prompting the caller to "speak up". Where clipping occurs in the context of low SNR and/or quiet, then the caller may be prompted to "reduce background noise and try again".

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A method for using input signal quality to improve speech recognition, comprising:
   obtaining quantitative measurements of the quality of an input signal of a speech recognition system, the quantitative measurements including at least a signal-to-noise ratio and a loudness of the input signal;
   analyzing the quantitative measurements to categorize the quality of the input signal into a qualitative category; and
   establishing a rejection threshold used in rejecting a speech recognition result for speech included in the input signal in dependence on the qualitative category of the input signal quality, the speech recognition result having a confidence score indicating a level of confidence in an accuracy of the speech recognition result, the rejection threshold establishing which confidence scores indicate that the speech recognition result is to be rejected as being incorrectly recognized.

2. The method of claim 1, wherein, if the qualitative category of the input signal indicates that the input signal quality is low, establishing the rejection threshold comprises reducing a baseline rejection threshold.

3. The method of claim 1, wherein, if the qualitative category of the input signal indicates that the input signal quality is high, establishing the rejection threshold comprises increasing a baseline rejection threshold.

4. The method of claim 1, wherein the rejection threshold is set in an underlying multivariate Gaussian distribution within an acoustic model of the speech recognition system.

5. The method of claim 4, wherein reducing the rejection threshold increases the skirts of the underlying multivariate Gaussian distribution and increasing the recognition threshold reduces the skirts of the underlying multivariate Gaussian distribution.

6. The method of claim 1, wherein the rejection threshold is a configurable rejection threshold of a pattern matcher based on a confidence value of the output of the speech recognition system.

7. The method of claim 1, wherein the loudness measurement includes determining if the input signal is clipped.

8. The method of claim 1, wherein the quantitative measurements include a speech signal duration of the input signal.

9. The method of claim 8, wherein the speech signal duration of the input signal is compared to the duration of a signal for a text-to-speech converted word.

10. The method of claim 1, wherein the method provides an input signal quality score for each time-slice.

11. The method of claim 10, wherein the input signal quality score is based on a combination of loudness and signal-to-noise ratio.

12. The method of claim 10, wherein a time-slice with a clipped signal is indicated as unreliable.

13. The method of claim 10, wherein the input signal quality scores for time-slices over a speech signal are summed.

14. The method of claim 13, wherein a confidence score for the output of a speech recognition system is normalized by the input signal quality score for the speech signal.

15. The method of claim 1, wherein the rejection threshold is a confidence score below which the speech recognition result is to be rejected as being incorrectly recognized.

16. The method of claim 1, wherein the confidence score indicates a level of confidence that the speech in the input signal has been recognized correctly.

17. A system for using input signal quality to improve speech recognition, comprising:
means for obtaining quantitative measurements of the quality of the input signal of a speech recognition system, the quantitative measurements including at least a signal-to-noise ratio and a loudness of the input signal;
means for analyzing the quantitative measurements to categorize the quality of the input signal into a qualitative category; and
means for establishing a rejection threshold used in rejecting a speech recognition result for speech included in the input signal in dependence on the qualitative category of the input signal quality, the speech recognition result having a confidence score indicating a level of confidence in an accuracy of the speech recognition result, the rejection threshold establishing which confidence scores indicate that the speech recognition result is to be rejected as being incorrectly recognized.

18. The system of claim 17, wherein the rejection threshold is a confidence score below which the speech recognition result is to be rejected as being incorrectly recognized.

19. The system of claim 17, wherein the confidence score indicates a level of confidence that the speech in the input signal has been recognized correctly.

20. An article of manufacture comprising at least one non-transitory computer-readable storage medium having encoded thereon instructions which, when executed, perform acts of:
obtaining quantitative measurements of quality of an input signal of a speech recognition system, the quantitative measurements including at least a signal-to-noise ratio and a loudness of the input signal;
analyzing the quantitative measurements to categorize the quality of the input signal into a qualitative category; and
establishing a rejection threshold used in rejecting a speech recognition result for speech included in the input signal in dependence on the qualitative category of the input signal quality, the speech recognition result having a confidence score indicating a level of confidence in an accuracy of the speech recognition result, the rejection threshold establishing which confidence scores indicate that the speech recognition result is to be rejected as being incorrectly recognized.

21. The article of manufacture of claim 20, wherein the rejection threshold is a confidence score below which the speech recognition result is to be rejected as being incorrectly recognized.

22. The article of manufacture of claim 20, wherein the confidence score indicates a level of confidence that the speech in the input signal has been recognized correctly.

23. An apparatus, comprising:
at least one computer programmed to;
obtain quantitative measurements of the quality of the input signal of a speech recognition system, the quantitative measurements including at least a signal-to-noise ratio and a loudness of the input signal;
analyze the quantitative measurements to categorize the quality of the input signal into a qualitative category; and
establish a rejection threshold used in rejecting a speech recognition result for speech included in the input signal in dependence on the qualitative category of the input signal quality, the speech recognition result having a confidence score indicating a level of confidence in an accuracy of the speech recognition result, the rejection threshold establishing which confidence scores indicate that the speech recognition result is to be rejected as being incorrectly recognized.

* * * * *